Aug. 23, 1966  J. H. KOPERA  3,268,119
VENDING MACHINE EQUIPMENT

Filed Oct. 1, 1964  2 Sheets-Sheet 1

INVENTOR.
JOHN HENRY KOPERA
BY
Synnestvedt + Lechner
ATTORNEYS

Aug. 23, 1966   J. H. KOPERA   3,268,119
VENDING MACHINE EQUIPMENT

Filed Oct. 1, 1964   2 Sheets-Sheet 2

INVENTOR.
JOHN HENRY KOPERA
BY
Synnestvedt + Lechner
ATTORNEYS

3,268,119
VENDING MACHINE EQUIPMENT
John H. Kopera, Trenton, N.J., assignor to Rudd-Melikian, Inc., Warminster, Pa., a corporation of Pennsylvania
Filed Oct. 1, 1964, Ser. No. 400,852
12 Claims. (Cl. 222—129.1)

This invention relates to a steam exhaust system and more particularly to apparatus for conducting steam and other vapors away from a mixing station at which a hot fluid is mixed with a hygroscopic solid material.

The invention is especially useful in conjunction with vending machines of the type which dispense hot beverages formed by mixing a powdered food commodity with a hot beverage forming liquid. In machines of this type the beverage forming liquid must be very near the boiling point in order to properly prepare a palatable beverage, such as hot tea, coffee, soup or chocolate. A severe problem arises in these machines since the hot beverage forming liquid gives off large amounts of steam or water vapor at the beverage mixing station. This steam comes in contact with the discharge orifices of the various food commodity containers which supply the food commodity to the beverage mixing vessel. Since these commodities are usually in powder form and are by their very nature quite hygroscopic, they readily take up the water vapor and become quite gummy or sticky. This causes jamming of the food commodity feeders, deterioration of product quality, irregular measurement of the powder, lumpiness of the material in the cup and may cause intermingling of various beverage forming commodities in the beverage mixing vessel.

In an attempt to deal with this problem exhaust fans have been placed with an intake near the mixing station in order to suck the steam away as it evolves. A serious drawback with the prior art exhaust systems has been that as the steam is sucked away from the mixing station, the light weight powdered commodities are also sucked away as they are discharged into the mixing vessel. This results in a waste of material, causes uneven feed of the food powder to the liquid, and distributes gummy food commodity over the mixing vessel and the exhaust system.

With the foregoing in view, it is an object of the present invention to provide an improved steam scavenging unit which prevents the accumulation of gummy commodity throughout the beverage forming equipment.

It is a further object to provide a steam scavenging unit which improves the uniformity of beverages dispensed in a hot beverage brewing apparatus.

A still further object of the invention is the provision of air circulating equipment in connection with a beverage mixing vessel in which the air flow is directed in such a manner that it assists the flow of the commodity into the mixing vessel.

A still further object of the invention is the provision of a vapor exhaust system which embodies the qualities of efficiency, simplicity and dependability essential for equipment used in the vending of food commodities.

How these and other objects of the invention are achieved will appear more fully hereinafter in the following description and in the accompanying drawings in which.

Figure 1:
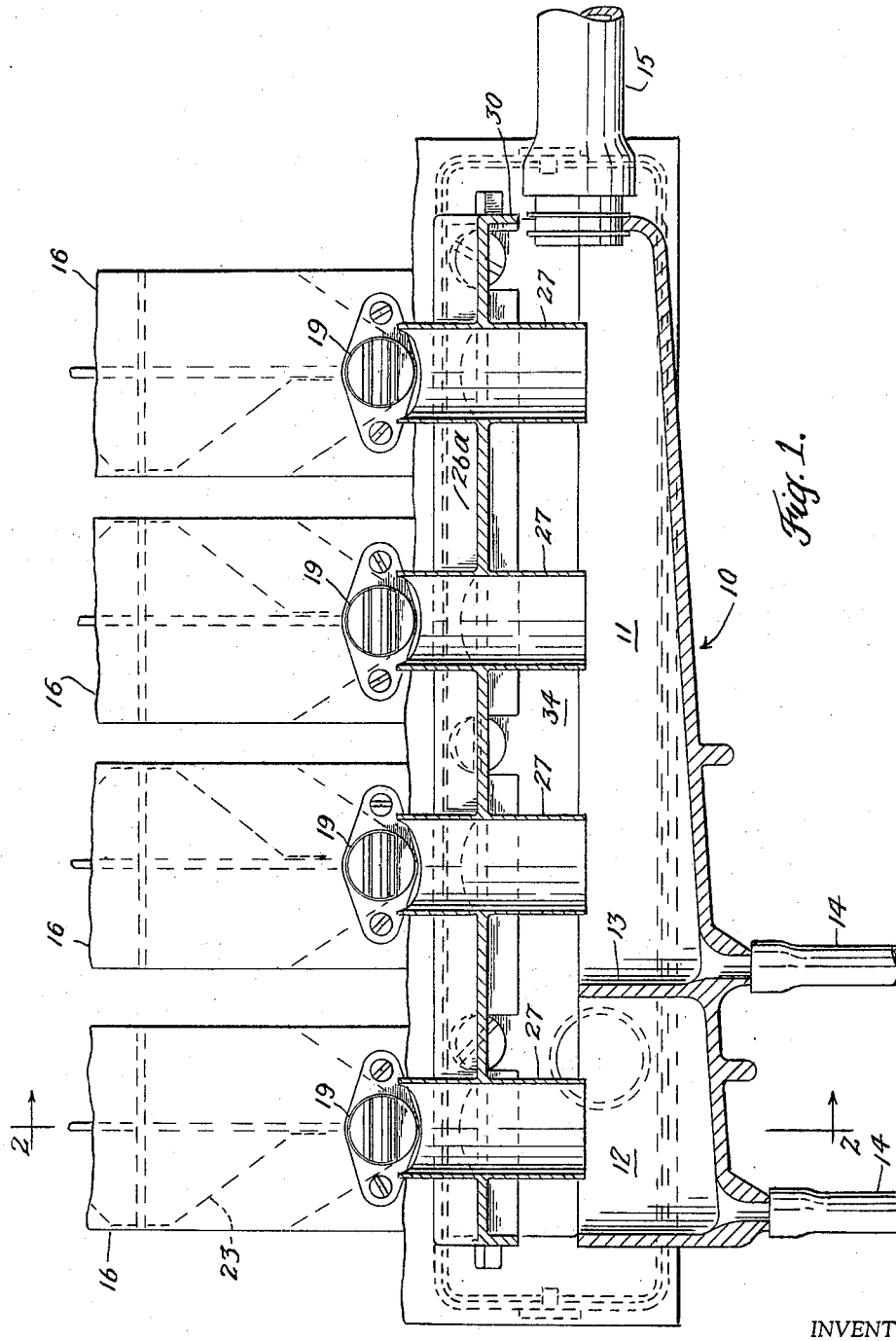
FIGURE 1 is a front view, partly in section, of vending machine beverage mixing equipment embodying the scavenging system of the present invention.

The present invention is illustrated in conjunction with a typical form of hot beverage preparing equipment which preferably includes a trough 10 having two compartments 11 and 12, separated by a partition 13. This separation makes it possible to mix and dispense two different types of beverages from the mixing trough; for instance, soup and other salty beverages might be mixed in the chamber 12 while coffee or tea would be dispensed from the right-hand chamber 11. Each of the chambers is provided with dispensing conduits 14 which lead to a dispensing station at which point a paper cup (not shown) is placed just prior to the brewing and dispensing cycle. Each chamber within the trough 10 is provided with an inlet conduit; one such conduit being shown at 15, through which hot water or other hot beverage forming liquid may be selectively supplied to the chamber 11.

Figure 2:
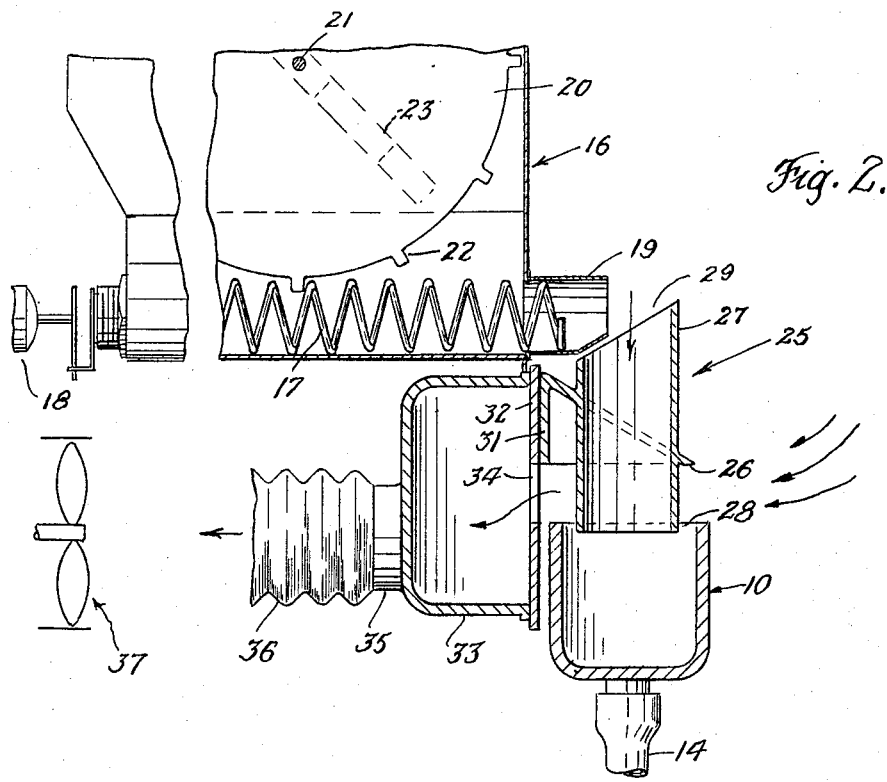
FIGURE 2 is a side view in section taken along line 2—2 in FIGURE 1.
Figure 3:
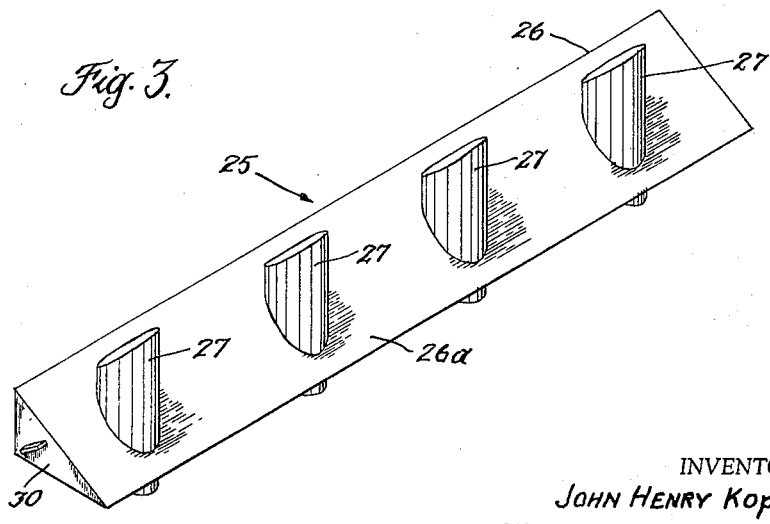
FIGURE 3 is an isometric projection of an important feature of the invention; namely, the hood which covers the beverage mixing vessel.

A plurality of powdered food commodity containers 16 are mounted above and somewhat behind the mixing trough, as may be clearly seen from an inspection of FIGURES 1 and 2. These containers or receptacles are of conventional construction and each is adapted to hold a quantity of a powdered food substance; for instance, soup, cream, tea and sugar in the illustrative embodiment.

The containers are each provided with helical feed conveyors 17 as best shown in FIGURE 2. Each conveyor 17 is rotated by electrical drive means 18 and each is selectively operatable by suitable control structure to dispense the desired food commodity out of suitable outlet spouts 19, disposed with their openings directly over the mixing trough 10.

A toothed mixing wheel 20, mounted on an axis 21, is located within each of the commodity containers 16. Teeth 22 on the wheels 20 cooperate with the convolutions of the helices 17 to rotate the wheels when the selected commodity drive means 18 is energized. Each wheel is provided with laterally extending arms 23 which thoroughly stir the powdered commodity, counteracting any tendency of the product to become lumpy and assuring uniform delivery of the food commodity to the mixing trough.

When the desired beverage is selected by the consumer, a quantity of hot water or other hot beverage forming liquid, at a temperature near the boiling point, is discharged through the appropriate conduit such as conduit 15, into the mixing trough 10. At the same time, the drive 18 rotates the selected helical feed member 17 and the powdered commodity is discharged into the hot liquid flowing down the slight incline within the trough 10. For example, if the selected beverage is tea with sugar, the drive means for the tea and sugar commodity boxes will cause discharge of these two commodities from the appropriate containers 16 and water which has entered into the trough through conduit 15 will mix with these commodities to form the beverage.

My improved means for scavenging the steam arising from the trough and for circulating the air will now be described. This apparatus includes a baffle assembly 25 disposed above and spaced from the mixing trough 10. The baffle assembly includes, in the illustrative embodiment, a hood portion 26 and a plurality of discharge pipes 27; one discharge pipe 27 being provided for each dispensing box outlet. The discharge pipes extend into the mixing trough a slight distance below the rim of the trough as is indicated by the numeral 28 in FIGURE 2. Each discharge pipe inlet is preferably cut on an angle 29 and is positioned with respect to the outlet 19 of the commodity dispenser so that a major portion of the outlet opening 19 is surrounded and shielded by the uppermost edge of the pipe 27.

The discharge pipes pass through the upwardly inclining plate portion 26a which forms the roof of the hood 26.

The hood is further provided with suitable end walls 30 and a plate-like generally vertically disposed back-wall member 31. The structure is mounted on a suitable frame support member 32 in proper position between the commodity discharging conduits and the trough 10. Although the baffle assembly could be formed of a plurality of individual sheet metal parts secured together by welding or the like, the assembly lends itself well to being constructed as an integral unit and in the illustrative embodiment the baffle assembly is formed as an integral plastic piece by an injection molding process.

The equipment for creating an air flow across the top of the trough 10 further includes a manifold 33 (FIGURE 2) secured to the plate 32 having a longitudinal slot 34 opening into the space between the hood and the trough 10. This slot is positioned to the rear of and lengthwise of the upper trough rim. The manifold is provided with an outlet duct 35 and suitable tubing 36 which leads to an exhaust fan 37 and a suitable vent (not shown) for evacuating the vapors arising from the hot fluid.

In operation, the air circulatory system draws air from the front of the vending machine, through the opening defined by the leading edge of plate 26a and the trough sidewall, across the surface of the trough 10, through opening 34 and out through the manifold 33. As best shown in FIGURE 2, the space within the hood 26 gradually increases in the direction of air flow so that the stream of air drawn through the opening between the front of the trough and the leading edge of the hood expands as it flows into the space and a relatively high volume, low velocity air flow is created. The uppermost portion of the wall of each discharge pipe 27 tends to shield the discharge orifice 19 from the flow of air and hence the powdered commodity does not escape into the air. In addition, the positioning of the outlet openings of the discharge pipes slightly below the rim of the trough 11 prevents the powders from being drawn through the slot 34, since before doing this they would strike the side of the trough 10.

In preferred practice, it is desirable to limit the distance which the discharge pipes extend into the trough, since by doing so it is possible to create a draft down the discharge pipe into the trough by means of the circulatory system. This draft is desirable since it draws the commodity into the discharge pipe and causes it to flow directly to the trough without sticking on either the discharge pipe walls or on the upper portions of the trough walls. The amount that the discharge pipe extends into the trough can be readily determined by one skilled in the art, being dependent upon the capacity of the exhaust fan and the size and design of other elements in relation thereto such as the exhaust duct 36 and the manifold 33 as well as the spacing between the hood and the trough 10.

In summary, the present invention provides a remarkably efficient steam scavenging unit which has been found to be particularly effective for use in hot beverage brewing equipment. The unit has been found to practically eliminate problems resulting from mingling of the steam with the hygroscopic beverage forming powders and has materially improved the efficiency of such equipment and has resulted in reduced machine servicing costs.

I claim:

1. In apparatus for dispensing hot beverages, said apparatus including a receptacle containing powdered food having an outlet for dispensing food therefrom, and a trough having bottom and side wall portions within which beverages are prepared by mixing the powdered food with a hot beverage forming liquid, the combination comprising:

a delivery conduit for discharging the food from the receptacle downwardly into the trough, a hood disposed above the trough, said food delivery conduit passing through said hood and extending downwardly to a point slightly below the top of the trough sidewalls, air intake and outlet openings spaced between said hood and said trough side walls, and means for creating a flow of air through said openings and transversely of the trough.

2. Apparatus according to claim 1 wherein the hood is inclined upwardly in the direction of the air flow whereby to increase the volumetric capacity of the air passageway.

3. Apparatus according to claim 1 wherein said commodity delivery pipe is positioned with respect to the trough side walls so that a downwardly moving draft is created in the conduit by the air circulatory system.

4. Apparatus according to claim 1 wherein said delivery conduit is positioned with respect to said commodity outlet to substantially shield the outlet from the air being drawn through the air inlet passage.

5. In vending machine apparatus for dispensing hot beverages, said apparatus including a trough having bottom and side wall portions within which beverages are prepared by mixing hygroscopic food commodities with a hot beverage forming fluid, the combination comprising:

means for scavenging vapors released by the fluid within the trough including an air circulatory system for creating a flow of air across the trough, a baffle assembly for substantially isolating the powdered commodity from the flow of air across the trough, said baffle assembly including a vertically disposed commodity delivery conduit having a discharge opening positioned to discharge commodity into the trough, said baffle assembly further including a hood, said hood comprising a first rectangular plate member surrounding the delivery conduit and extending upwardly at an angle over said trough from a point spaced above and in substantial vertical alignment with one of said trough side walls and a second vertically disposed rectangular plate intersecting the first plate along a line in substantial vertical alignment with the other trough side wall, the lower edge of the first plate and the adjacent trough side wall being spaced to form an air inlet opening, an air outlet opening between the lower edge of the second plate and the trough side wall adjacent thereof, the direction of air flow across said trough being through the inlet opening across the trough to the outlet opening.

6. Apparatus according to claim 5 wherein said delivery conduit extends below the level of the upper edge of the trough side walls.

7. Apparatus according to claim 6, wherein said delivery conduit is maintained above the level of the fluid in the trough a sufficient distance to allow said circulatory system to maintain a downwardly moving air flow within the conduit.

8. In apparatus for dispensing hot beverages, said apparatus including a rectangular trough within which beverages are prepared by mixing a powdered food commodity with a hot beverage forming fluid, the combination comprising:

an air circulatory system for creating a flow of air across the trough, a baffle assembly for substantially isolating the powdered commodity from the flow of air across the trough, said baffle assembly including a delivery conduit for discharging powdered commodity into the trough, and a hood, said hood having a first planar portion disposed above said trough and inclined upwardly over said trough from a point in substantial vertical alignment with one of the trough side walls and a second planar portion disposed in substantial vertical alignment with the opposite trough side wall, said delivery conduit extending through the upwardly inclined portion of said hood to a point slightly below the upper edge of the trough side walls, an air inlet passage between the lower edge of the inclined portion of the hood and the adjacent trough side wall, and an outlet air passage spaced across the trough from the inlet air passage, the direction of air flow being from the inlet air passage across the trough and through the outlet air passage.

9. Apparatus according to claim 8 wherein said inlet passage is a slot extending along a substantial portion of the length of the mixing trough.

10. In apparatus for dispensing hot beverages including a trough having upwardly extending side and end walls and within which beverages are prepared by mixing hygroscopic food commodities with a hot beverage forming liquid, liquid supply means for the trough including an inlet conduit for supplying the hot beverage forming liquid thereto at a temperature at or near the boiling point, a commodity dispensing receptacle having an outlet disposed above said trough for delivering the food commodity thereto, the combination comprising:

means for scavenging vapors released by the fluid within the trough including a circulatory system having means creating a flow of air across the trough, a baffle assembly providing for substantial isolation of the powdered commodity from the flow of air across the trough, said baffle assembly including a commodity delivery pipe having an inlet for receiving the commodity from the commodity outlet and extending to a point within the trough slightly below the level of the trough walls, and a hood, said hood comprising:

a first plate member surrounding said delivery pipe and extending upwardly at an angle over said trough from a line spaced above and in substantial alignment with one of said side walls and a second rectangular plate intersecting said first plate along a line in substantial alignment with the other side wall of the trough, the lower edge of said first plate and the adjacent trough side wall defining a first opening, the lower edge of the second plate and the trough side wall adjacent thereto defining a second opening, the direction of air flow across the trough being from said first to said second opening.

11. Apparatus according to claim 10 wherein said delivery pipe inlet includes an upwardly extending portion substantially shielding the commodity outlet from the air drawn through said first opening.

12. Apparatus according to claim 10 wherein said circulatory system further includes an exhaust manifold enclosing said second opening, an exhaust conduit connected to said manifold, and an exhaust fan connected to said conduit.

References Cited by the Examiner
UNITED STATES PATENTS

| | | | |
|---|---|---|---|
| 2,397,731 | 4/1946 | Fowler | 98—115 X |
| 2,614,738 | 10/1952 | Mills | 222—129.3 X |
| 2,755,000 | 7/1956 | Parre | 222—129.4 |
| 2,843,293 | 7/1958 | Burgoyne | 222—129.4 |
| 2,939,614 | 6/1960 | Hill | 222—190 |
| 2,977,026 | 3/1961 | Delgado | 222—129.4 |
| 3,019,946 | 2/1962 | Mueller. | |

RAPHAEL M. LUPO, *Primary Examiner.*